Dec. 19, 1933.  J. BIJUR  1,939,653
CHASSIS LUBRICATION
Filed March 5, 1925   7 Sheets-Sheet 1

INVENTOR
Joseph Bijur
BY
his ATTORNEYS

Dec. 19, 1933.    J. BIJUR    1,939,653
CHASSIS LUBRICATION
Filed March 5, 1925    7 Sheets-Sheet 3

Fig. 4.

INVENTOR
Joseph Bijur
BY
Dean, Fairbank, Cheight & Hirsch
his ATTORNEYS

Dec. 19, 1933.   J. BIJUR   1,939,653
CHASSIS LUBRICATION
Filed March 5, 1925   7 Sheets-Sheet 4

INVENTOR
Joseph Bijur
BY
Dean, Fairbank, Wright & Hirsch
his ATTORNEYS

Dec. 19, 1933.  J. BIJUR  1,939,653

CHASSIS LUBRICATION

Filed March 5, 1925  7 Sheets-Sheet 5

Dec. 19, 1933.                J. BIJUR                1,939,653
CHASSIS LUBRICATION
Filed March 5, 1925            7 Sheets-Sheet 6

INVENTOR
Joseph Bijur
BY
Dean, Fairbank, Obright & Hirsch
his ATTORNEYS

Patented Dec. 19, 1933

1,939,653

UNITED STATES PATENT OFFICE 1,939,653

CHASSIS LUBRICATION

Joseph Bijur, New York, N. Y., assignor to Auto Research Corporation, a corporation of Delaware Application March 5, 1925, Serial No. 13,139, and in Great Britain April 30, 1924

59 Claims. (Cl. 184—7)

My present invention relates to motor vehicles and is concerned primarily with the lubrication of the bearings carried by or associated with the steering knuckle. In its most specific application, the invention relates to steering knuckles of the type equipped with brakes operated from a rock shaft bridging from the vehicle frame.

It is among the objects of the invention to reliably apply lubricant at any selected number or all of the bearings of the bridging rock shaft and of the knuckle, without the use of separate oil cups or protruding inlets for the individual bearings, and without detracting in any way from the ruggedness of the mechanical structure, or involving any exposed or flapping hose or other unprotected parts to convey the lubricant toward the steering knuckle.

Another object is to effect the lubrication of the various bearings automatically by the mere admission of lubricant at a single inlet carried at the vehicle frame, and this even through the knuckle extends to a level higher than the inlet, yet, without leak in the course of lubricant flow to any of the bearings, and without contamination of the lubricant or the bearings.

Another object is to provide a construction of the type mentioned, which involves no additional swivels or flexibles for transmitting lubricant, but permits of assembly or disassembly with substantially the same facility as if devoid of lubrication, and more especially one which inherently effects the lubricant conveying connections between the various structural parts thereof by the mere juxtaposition or interconnection of the latter in regular assembly.

The invention may be embodied either in the type of construction in which the rock shaft element that intervenes between the frame and the torque transmitting universal joint, coaxial with the king pin, constitutes a unitary shaft having a slide fit in the ball joint at the frame, or in which said rock shaft element has a universal ball joint at the frame and is itself of telescoping construction including a rod and an enclosing sleeve.

In either construction, the rock shaft is formed with an axial bore extending substantially the length thereof and supplied with lubricant at or adjacent the ball end thereof, and delivers to the knuckle end by flow through the universal joint that is coaxial with the king pin.

The lubricant may be admitted to the type of construction embodying a sliding unitary shaft either by flowing into such shaft from a well in the upper surface of the ball at the vehicle frame or by admission through a fitting carried by the end of the sliding shaft, which fitting in the case of a centralized lubricating system, may in turn, be supplied from a fixed inlet at the vehicle frame through an intervening flexible conduit accommodating the movement of the fitting with the slide shaft.

In the case of the type of construction embodying a cross shaft formed of a rod and a telescoping sleeve, a duct extends longitudinally through the length of the rod and is supplied through the ball, the lubricant inlet leading into said ball through the socket fitting mounting the ball.

The torque transmitting universal joint coaxial with the king pin and intervening between the brake rock shaft and the cam which has a stub shaft bearing in the brake shield, conforms in construction and operation with the various objects heretofore stated, and affords a passage for the lubricant onward therethrough to the knuckle with adequate lubrication of the bearings of said universal joint, without leak therethrough, without the entry of dust, dirt or water thereto, and without the need for special operations, or connections in assembly of the universal joint to establish the lubricant path therethrough.

Another object is to provide a universal joint of the type mentioned, the number of different or distinct machined parts of which shall be no greater than in prior universal joints of generally similar construction, but devoid of lubrication.

Another object is to provide a universal joint of the type mentioned, the lubricating equipment of which involves no increase of dimensions or mass and does not impair the true universal action of the joint.

The universal trunnion means of the joint is constructed and arranged to afford lubrication of the bearings thereof with oil admitted through the driving terminal and to permit the rest of such oil to pass onward therethrough without leak, to and through the driven terminal in order to supply other bearings.

If the universal joint has a relatively open construction, it should be enclosed in a boot to exclude dirt and water.

One desirable type of universal joint is inherently dust-excluding though devoid of a boot and comprises essentially a driving clevis, a driven clevis and pivot pins therefor maintained at right angles to each other and bearing in a trunnion block interposed between said clevises. The elements of the universal joint are formed with ducts or passages therethrough affording a continuous path for lubricant extending across tight-fitting connections between the consecutive elements, while permitting spread, to oil the bearing surfaces in the trunnion block. Felt gaskets about the bolts are compressed against the trunnion block to render the construction oil-tight and proof against the entry of dirt, dust or water.

The invention from another aspect is concerned with the local distribution of lubricant from an elevated point on the knuckle, to the various bearings carried by the knuckle or associated therewith, substantially regardless whether the lubricant is conveyed to the knuckle from the brake cross shaft, or whether, for instance, in constructions devoid of steering wheel brakes, the lubricant is supplied from any other type of conduit supplied from the frame or the axle, or from an oil cup carried by the knuckle.

It is an object of the invention to reliably divide the lubricant between the king pin and the tie rod bearing and in the case of the left-hand knuckle between the king pin, the tie rod and steering arm bearings, all without the need for special dividing elements and without the use of loose or flapping oil conveying tubes.

In general, where the steering knuckle is provided with braking means, it has a clevis straddling an eye on the axle and affording bearings for the king pin. In such construction, I prefer to admit the lubricant from the brake cross shaft through an appropriate duct in the brake shield into the upper clevis eye of the knuckle to a peripheral groove in the upper bearing bushing of the king pin, which peripheral groove through one or more radial ducts supplies lubricant to the king pin bearing and which groove is also drained by pipes extending along the brake shield and along the respective arms, one to the tie rod bearing and in the case of the left hand knuckle, another to the steering arm bearing. In a desirable construction, an excess of lubricant may be supplied to the latter bearing to overflow through a pipe extending the length of the steering drag link rearward to the rear bearing of the latter.

In the accompanying drawings in which are shown one or more of various possible embodiments of the several features of this invention.

Figures 1, 2A:
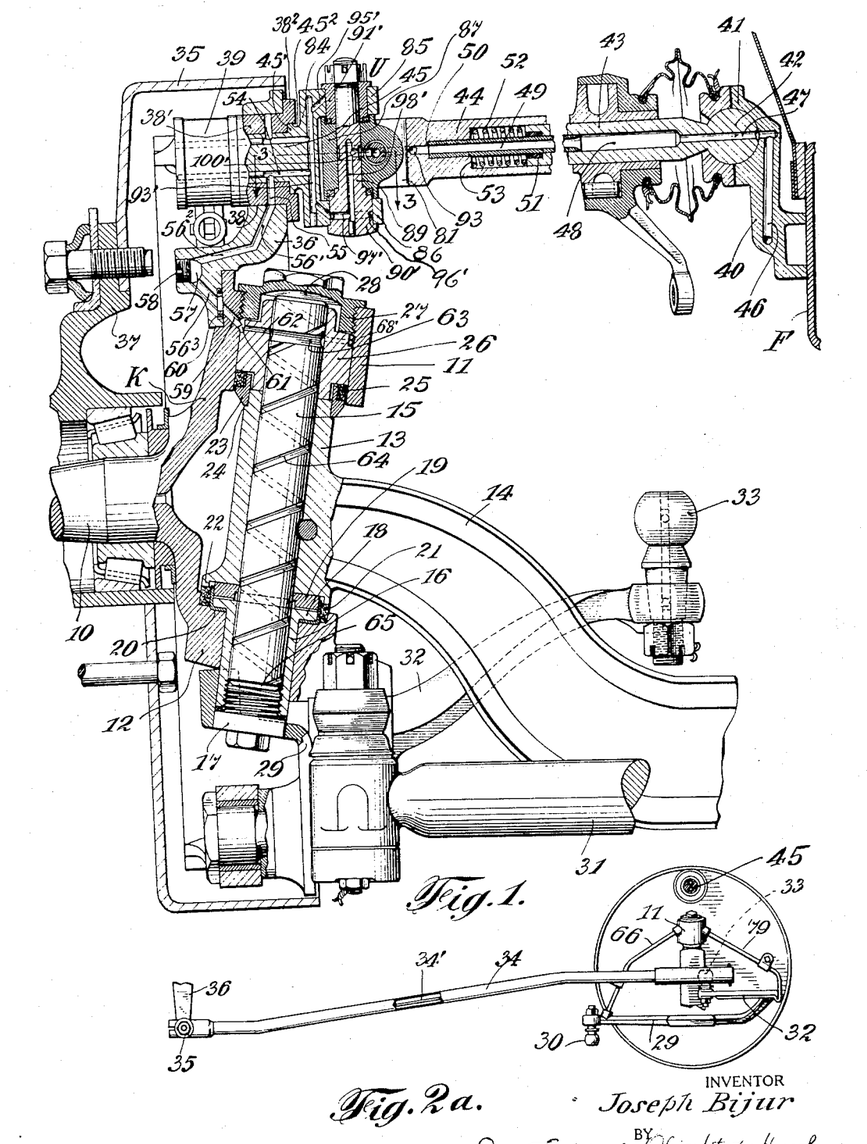
Fig. 1 is a view in longitudinal cross-section of a steering knuckle embodying a brake and the associated rock shaft with my lubricating arrangement.
Fig. 2a is an elevation on a reduced scale viewed from the axle side of the knuckle and the associated drag link, parts being shown broken away and other parts in section.
Figures 2, 3:
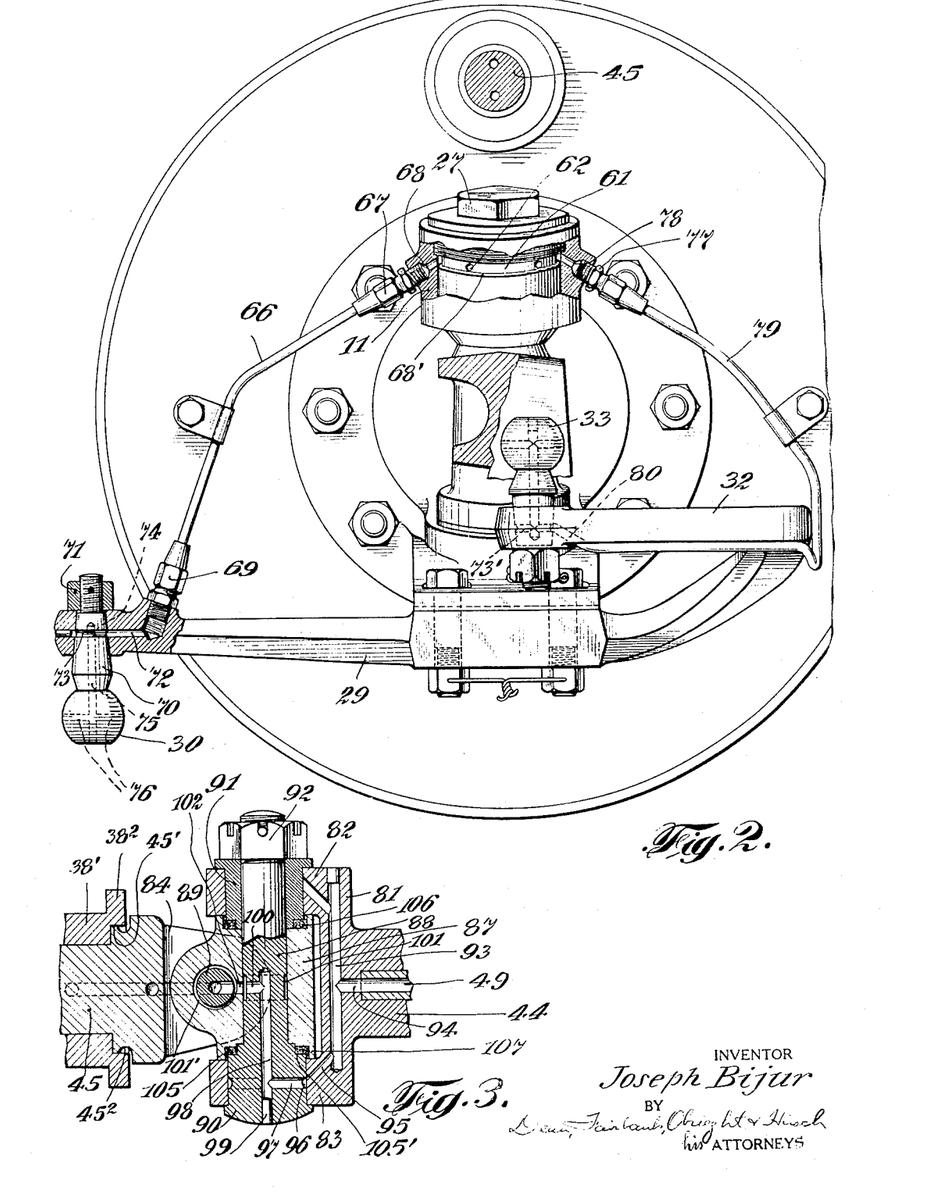
Fig. 2 is an elevation of the knuckle viewed from the side of the axle, parts being shown in section.
Fig. 3 is a sectional view taken along the line 3—3 of Fig. 1.

Referring now to Figs. 1, 2 and 3 of the drawings, I have shown a steering wheel assembly comprising a knuckle K having a wheel spindle 10, said knuckle including clevis jaws 11 and 12 straddling the eye 13 of axle 14, a king pin 15 constituting the pivot mount for the assembly. In the preferred construction, the lower clevis jaw 12 has a bushing 16 therein closed at its lower end by a screw plug 17, said bushing having a flange 18, constituting a thrust bearing for the lower end of the axle eye, which, in turn, carries a thrust washer 19 keyed thereto. A metal retaining shell 20 provides a rest for the thrust flange 18 of the bushing and is encircled by a dust-excluding ring 21 of cork maintained under compression by an annular flange 22 formed at the lower rim of the axle eye. By this construction, it will be seen that both the thrust bearing 18—19 and lower bearing 16 of the king pin are substantially proof against the entry of dust or water thereto, the cork washer 21 being maintained under compression, so that dust would not readily enter thereinto.

The upper bearing of the king pin is rendered dust-excluding by providing a grooved collar 23 seated against a corresponding shoulder 24 near the upper end of the axle eye and projecting upward therebeyond, a cork or felt ring 25 being lodged in the groove, as shown, and maintained under compression by a bushing 26 encircling the king pin, fitting in the clevis eye 11 and, in turn, pressed downward against said washer into contact with the end of the axle eye by a screw plug 27 threaded into the upper end of the upper clevis eye and affording a socket 28 therein to clear the upper end of the king pin 15.

The knuckle carries the usual tie rod arm 29 having a bearing 30 with the tie rod 31, and in the case of the left hand knuckle, which is illustratively shown in the drawings, there is also carried rigidly on said knuckle, the steering arm 32 having a bearing 33 for the drag link 34, which has a rear pivot bearing 35 at the lower end of steering lever 36. The embodiment shown includes a brake construction comprising a brake drum 35 rigidly mounted on the wheel hub 37 and a brake shield 36 mounted rigidly on the knuckle K and having an opening 38 lodging a split bearing bushing 38′ for the brake operating shaft which in the present embodiment is shown bridging transversely from the frame F to the knuckle K and has a cam 39 at the inner end thereof for operating the brake mechanism (not shown).

In the present embodiment, the brake cross shaft is utilized as the conduit through which lubricant is supplied to all of the bearings thus far described, including those of the king pin, the tie rod and the steering arm, and, in addition, including the lubrication of the various bearings in the cross shaft structure itself. A combined support and inlet fitting 40 is mounted on the frame, having a ball socket 41 rigid therewith enclosing the ball end 42 of a rod 43 about which is telescoped a sleeve member 44 which, through a universal joint U substantially in line with the king pin, operates the stub shaft 45.

The fitting 40 is provided with a bore 46 delivering into a bore 47 through ball 42 and axially of rod 43, whereby lubricant supplied through duct 46 will be freely admitted to duct 47 regardless of the position of rod 43 about its axis. Bore 47 delivers to an enlarged bore 48 in the rod 43 into which is telescoped the inner internally beveled end of preferably a steel pipe 49 having a tight fit in a corresponding socket or depression 50 in the sleeve 44 and having a close sliding fit in a bronze bushing 51, press-fitted into the inner end of the bore 48 of rod 43, and substantially of the diameter of bore 48. The sleeve and rod are normally maintained distended against rattling by a coil spring 52 encircling the pipe 49 and reacting at one end against the base 53 of the sleeve bore, and at the other against the end of the rod 43, thereby spring-loading the surface across which the lubricant enters the ball bore 47 and preventing leak thereat.

The lubricant is conveyed from the pipe 49 through the universal joint construction in a manner to be described hereinafter and passes thence into a longitudinal bore 54 in the stub shaft downward through a radial bore 55 in the bearing bushing 38', thence through a bore 56 in the rigidly fixed brake shield 37 into a registering bore 59 in the clevis 11 delivering immediately below the plug 27. For convenience in drilling, the bore 56 includes a length 56' bored from the cam shaft support, a length 56² communicating therewith and drilled from a socket 57 in the inner face of the shield and a bore 56³ also drilled from said socket 57, which latter is closed by a screw plug 58. The shield 36 has a snug fit against knuckle K and to guard against leak at the contacting surface, a felt ring 60 encircling the bore is pressed between the shield and knuckle in a corresponding countersink in the former. A shoulder 68' in bushing 26 forms with the bottom of said closure plug a peripheral groove 61 to which the lubricant is delivered from bore 59 and from which the lubricant is distributed between various bearings, as will be now described.

Some of the lubricant in groove 61 passes through radial bores 62 of bushing 26 inward to the surface of the king pin 15 collecting at a peripheral groove 63 and supplying the upper bearing, the excess passing downward along a spiral groove 64 to the lower bearing 16 and collecting in the well 65 formed between the bottom of the king pin and the top of plug 17. It will be understood that lubricant will naturally spread outward from the king pin to lubricate the thrust bearing 18—19, and to partially fill retaining shell 20, thereby maintaining the thrust bearing under oil.

The peripheral groove 61 also drains lubricant to the tie rod bearing 30 through a pipe 66 along the brake shield and fixed thereto, having an inlet fitting 67 threaded into a corresponding socket 68 in the eye 11 and communicating with the groove 61, the outlet fitting 69 of said pipe being applied near the outer end of the tie rod to deliver to the bearing thereof. Specifically, the tie rod arm bearing is a stud 70 having a taper plug fit in the arm and tightened by nut 71. Lubricant is supplied to the ball bearing by way of bore 72 in the arm, delivering to peripheral groove 73 about the stud, which through radial bore 74, longitudinal bore 75 and radial bores 76, supplies the bearing. A similar arrangement is provided for also supplying lubricant from the groove 61 to the bearing of the steering arm, said arrangement also comprising a fitting 77 in a corresponding well 78 at the eye 11 tending to drain the groove 61, a pipe 79 extending along the structure of the brake shield and thence along the length of the steering arm 32 delivering to the bearing 33. The bearing of the steering arm is similar to that of the tie rod arm, except that its ball end extends upward instead of downward, but is yet at a level sufficiently low to be fed by drainage from groove 61, and the end of pipe 79 extends directly as at 80 into the arm to deliver to groove 73'. In a desirable embodiment, as shown in Fig. 2a an excess of lubricant is supplied to bearing 33, and drains through a pipe 34' in the drag link 34 rearward to the rear bearing 35. The specific construction of drag link taken by itself is not claimed herein, said feature being fully disclosed and claimed in my copending application, Serial No. 695,740, filed February 28, 1924.

The universal joint shown includes a driving clevis 81 having jaws 82 and 83, a driven clevis 84 of similar construction having jaws 85 and 86, and formed in an integral piece with the stub shaft 45, said clevises connected in driving relation by a trunnion block 87 interposed therebetween, affording bearings at right angles to each other, one for the pin 88 mounting said block in the jaws of the driving clevis 81, and the other for the pin 89 connecting said block to the driven clevis 84. Pin 88 has a head 90 fitting snugly preferably with a friction fit in the eye of clevis jaw 83, and a bushing 91 about the shank fits in the eye of the opposite clevis jaw 82, said bushing and head being drawn toward each other by the tightening of a nut 92 on the end of said bolt. Pin 89 is preferably of construction identical with pin 88 and has a head 90' friction fitted in the eye of clevis 84, and a shank encircled by bushing 91' in the opposite clevis eye 85.

For lubricating the embodiment of universal joint described, there is provided a bore 93 in the base of the driving clevis supplied from tube 49 through a short connecting bore 94 in sleeve 44 and delivering through an oblique bore 95 to a peripheral groove 96, about the head 90 of the driving pin which groove, in turn, delivers through a radial bore 97 to an axial bore 98 extending to beyond the middle of said pin, its outer end plugged at 99. Bore 98 delivers through a radial bore 100 outward to a peripheral groove 101 about the driving pin which is connected to the corresponding peripheral groove 101' about the driven pin by a short bore 102 in the trunnion block 87. The driven pin 89 has bores and grooves identical with those of the driving pin 88, so that the pins are interchangeable. Corresponding oil passages in the driven pin bear the same reference numerals as in the driving pin, primed, however.

It is preferred to provide oblique bores 95, 95' leading to both of the eyes of each of the clevises, so that the heads of the bolts can be inserted through either jaw of the clevis, thereby facilitating assembly. Lubricant flow takes place as will be readily understood from the pipe 49 by way of bore 94 through bore 93, lower oblique bore 95, peripheral groove 96, radial bore 97, longitudinal bore 98, radial bore 100, groove 101, through the bore 102 in the trunnion block to groove 101' about pin 89, thence through the radial bore 100' downward through the axial bore 98' outward through the radial bore 97' to the peripheral groove 96', thence through the oblique bore 95' up through the bore 93' outward through the bore 54 in the stub shaft and thence through composite bore 55—56—59 to groove 61 from which the division takes place in the manner heretofore described, for lubricating the king pin, the tie rod and the steering arm bearings. It will be understood that a part of the lubricant in groove 101 will spread laterally therefrom to oil the bearing surface of pin 88 in trunnion block 87 and similarly lubricant passing to the peripheral groove 101' of pin 89 will spread laterally therefrom to lubricate the bearing of said pin in the trunnion block.

To render dust-tight the construction of the universal joint and to prevent the loss of lubricant therefrom, I provide felt rings 105 and 106 which are placed under compression, as shown, the former in a corresponding groove at the inner end of the head 90 and enclosed in a corresponding depression 107 in the trunnion block and the companion being similarly related with respect to a peripheral groove in the bushing 91. The construction of washers at the driven pin or bolt is identical with that just described and requires no special description.

By the arrangement shown, it will, therefore, be seen that the universal joint, although unenclosed, will yet provide a continuous course for lubricant without leak therefrom or entry of dust thereto, the bearings of the universal joint itself being lubricated by the oil conveyed through said joint, while leak of lubricant from the ends of said bearings is prevented by the compression washers thereat.

The universal joint functions satisfactorily from a mechanical point of view, since the two pivot pins 88 and 89 are close together, and the oil flow is effective since it occurs at a substantially uniform level without having to be raised in its passage to and through the driving pin, flowing downward through bore 98' in the driven pin, and only then in seeking its level, does the flowing oil, move upward through bore 93' to enter bore 54. Bores 93', 97' and 98' will ordinarily remain filled with lubricant up to the level of bore 54. This volume is relatively minute, less than the approximate 1.5 c. c. volume of a single charge from the inlet. At every operation, accordingly, the minute stored charge escapes through bore 54 and a similar charge from the inlet fitting takes its place. The lubrication of the knuckle bearings, accordingly, does not necessitate preliminary filling of a large reservoir. The universal joint, it will be seen, from the foregoing, is capable of transmitting lubricant therethrough under pressure, if need be, for instance, if the bridging shaft slopes upward rather than downward to the knuckle, as, for instance, in the embodiment of Fig. 8 described below.

My construction of brake is operated in the same manner and with the same facility as if it were devoid of any lubricating appurtenances. The up and down movement of the knuckle relative to the frame in operation, of the vehicle with vehicle spring flexure, is accommodated by rocking of both the ball joint 42 and the universal joint U, as well as the telescroping of rod 43 and sleeve 44. The steering movement of the knuckle is accommodated by the universal joint U. In any position of the knuckle relative to the frame, lubricant may be passed reliably from fitting 40 into and through ball duct 47 to the interior of rod 43, thence up the internally beveled end of pipe 49 through the length thereof, thence through the universal joint in the manner heretofore described.

Some of the lubricant from bore 46 will wet the bearing surface of the ball joint 41—42 and lubricate the same and similarly the outside of pipe 49 will be lubricated in the telescoping action thereof, by oil in bore 48, affording an effective lubricated slip joint. The bushing 51 fits about pipe 49 sufficiently snugly to prevent the passage of appreciable quantities of lubricant therebeyond, but sufficient passes to lubricate the main slide joint 43—44.

As shown in Figs. 1 and 3, the stub shaft 45 has a flange 45' fitting within a corresponding countersunk groove in the flange $38^2$ of the bushing 38'. The stub shaft flange 45' has a peripheral groove $45^2$ partly overlapped by flange $38^2$ of the bushing. By this arrangement, the entry of dirt or water to the stub shaft bearing is substantially precluded, such foreign matter tending to pass around and drop from off groove $45^2$ rather than to work its way into the bearing.

It will thus be seen that the various bearing surfaces of the brake operating mechanism and on the knuckle are all lubricated by conveying the lubricant lengthwise through the mechanism, successively past the bearing surfaces, and by dividing the lubricant which has flown through the entire brake operating mechanism at the clevis eye 11 for supplying the king pin, tie rod and steering arm bearings. The flow from groove 61 is by gravity largely, and it will be noted that there are no obstructions, such as valves that might impede gravity operation.

It will be seen that the construction is particularly simple, involving no exposed piping of any kind on the brake operating mechanism, the oil passages being entirely in the interior of these relatively rugged elements, where they are adequately protected. Moreover, in assembling or disassembling the brake operating linkage, the lubricating appurtenances thereof can be, in effect, ignored, as each element of the linkage is a unit with the lubricating feature thereof, and in the ordinary assembly of the parts, the lubricating passage through the linkage is automatically established without further attention and without the addition of any separate connections.

In the usual manufacture of motor vehicles, the front wheel knuckles are frequently not positioned with painstaking accuracy relative to the frame, so that the left-hand knuckle may be almost a half inch nearer to or farther from the left channel frame, than the right knuckle with respect to the right channel frame. The telescoping adjustment of sleeve 44 with its pipe 49 and rod 43 which obviously compensates for these variations, in no way impairs the efficacy of the lubrication. Lubricant delivered through pipe 49 will thus pass on reliably in the manner previously set forth, to the universal joint and knuckle bearings. In the preferred embodiment, in which the knuckle end of the bridging shaft is as low or lower than the chassis frame end thereof, it will be seen that the lubricant will pass to the knuckle by gravity and will have no tendency to return toward the frame.

Since a substantial length of the tube or rod structure 43 is rigid with the ball 42, considerable leverage is afforded, functioning in operation of the vehicle to automatically move the joint, should it become stiff from setting up tight or from corrosion.

In Figs. 4 to 7 is shown a modified form of brake cross shaft, in which the shaft 110 is a unitary element having a slide bearing fit within a ball 111 lodged in a socket 112 on the channel frame. Aligned with bearing pin 113, I have illustratively shown a universal joint of construction such that it remains assembled for use, by the mere inter-fitting of the constituent bearing elements thereof without the need for nuts or other distinct fastening elements. For this purpose, the knuckle end of the cross shaft 110 is provided with an eye 114 through which extends a pin 115 of length equal to the diameter of the eye. The eye with its cross pin are both enclosed within the contour of a larger pivot pin 116 of diameter equal to that of the eye. The outer half of the eye extends into a corresponding rectangular slot 117 through the middle of pivot pin 116 and the pin 115 is inserted through a transverse hole 118 midway across slot 117. Slot 117 widens as at 119 longitudinally of pin 116 from beyond that diameter of eye 114 which extends longitudinally of pin 116, thereby affording clearance to permit rocking of shaft 110 about pin 115, as an axis. Both the surface of the eye 114 and of the pin 115 are rounded to come flush with the cylindrical surface of the pin 116. The pin 116 is lodged in a corresponding trough 123' in the enlarged frame end 123 of the stub shaft 120, said trough extending about the pin 116 through an angle greater than 180 degrees, so that the joint will not come apart by tension along shaft 110. The stub shaft is mounted in a split bearing bushing composed of complementary elements 121 fitted in a corresponding opening in the brake shield, each element of said split bushing including a semi-cylindrical enlargement 122 to enclose the enlarged cylindrical end 123 of the stub shaft together with the various elements of the universal joint above described. The ends of the pin 116 are made spherical as at 124 and contact the inner wall of bushing enlargement 122, for non-rattling, low-friction rocking coaction.

To assemble the joint, the eye 114 is inserted at the opening 119 of pin 116, then the cross-pin 115 is admitted through hole 118 and finally the pin 116 is slipped into the bearing trough 123' therefor, the assembly being completed by the application of the split bushing 121 thereabout. The rocking axes of pins 115 and 116 are at right angles to each other, but intersect, which affords an especially advantageous operation.

To lubricate the various bearings of the assembly thus far described, an appropriate lubricant source such as an oil cup or preferably a lubricant control fitting, such as a drip plug fitting 126, supplied from a remote source, is fixed in the support bracket 112 and delivers through a duct 127 therethrough into a short pipe 128 which drips into a well 129 cut into the upper surface of ball 111 and maintained uppermost in all conditions of operations by a stud 130 fixed in the lower end of the socket 112 and extending into a longitudinal slot or keyway 131 of corresponding width, in the ball 111. The well 129 drains through a radial bore 132 to a flat 133 at the corresponding end of the cross-shaft 110, said flat inherently maintained substantially uppermost by the brake adjustment of the cross shaft. The flat 133 communicates through a bore 136 radially of shaft 110 with a longitudinal bore 137 extending axially of the entire length of said shaft and plugged at its frame end at 138.

Figure 4:
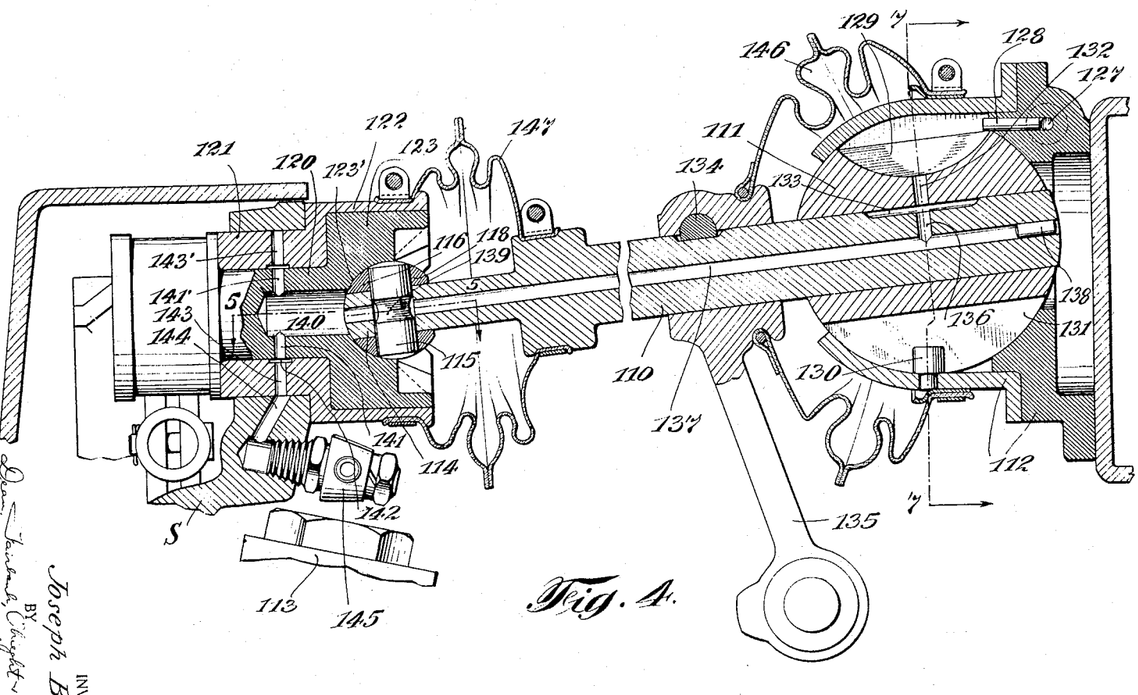
Fig. 4 is a fragmentary view showing a modified form of brake rock shaft in longitudinal section.

The pin 115 has a central peripheral groove 139 and the stub shaft 120 has an axial bore 140 of relatively large diameter therein extending substantially to the middle of the length of bushing 121 and communicating through a bore 141 radially of the stub shaft with a groove 142 in the bushing, which drains through a corresponding radial bore 143 in the bushing, into an oblique bore 144 in the brake shield from which the bearings carried by the knuckle may be lubricated, preferably by a construction such as shown in Figs. 1 and 2. I have illustratively shown an alternative arrangement comprising a dividing fitting 145 threaded into shield S and supplied at its stem from bore 144 and delivering through pipes (not shown) to the various bearings associated with the knuckle.

A leather flexible boot 146 preferably connects the operating link 135 with the socket 112 to exclude dirt and dust from the frame joint and a similar boot 147 connects the bushing 121 and the cross shaft 110 to prevent the entry of dust to the universal joint.

The operation will be apparent from the description above, so that it need merely be briefly stated here that lubricant from the pipe 128 drops into well 129, some, however, being wiped about the ball 111 to lubricate its bearing in socket 112. The well drains through ducts 132 and 136 into the longitudinal bore 137, some, however, spreading from the flat 133 to lubricate the slide bearing of the shaft 110 within ball 111. The lubricant that has passed through bore 137 will spread from the groove 139 about pin 115 to lubricate the bearing of that pin within the larger pin 116 and spreads onward from beyond the ends of pin 115 to lubricate the bearing of the larger pin 116 within its trough 123', excess lubricant passing onward through the open knuckle end of the brake shaft bore 137 into the bore 140 of the stub shaft 123 and thence by gravity downward through ducts 141, 143 and 144 onward to the bearings carried by the knuckle. It will be understood that the flat 133 and groove 142 assure proper passage respectively of the lubricant into the cross shaft 110 and from the stub shaft 123 regardless of variations in the rotary setting of these elements.

It is preferred, as shown in the drawings, to duplicate the bore 141 at the diametrically opposite side of the stub shaft 123, as shown, and to provide a similar bore 143 in both the upper and lower bushings 121. This is merely for convenience of manufacture and assembly, so only one construction of the bushing half is required. In the finished construction, the upper bores 141' and 143' perform no function, and since they are not in the course of gravity flow, no leak occurs thereat. Uppers and lowers may be interchangeably used, an arrangement also shown in Fig. 1.

Figures 8, 9, 11, 12:
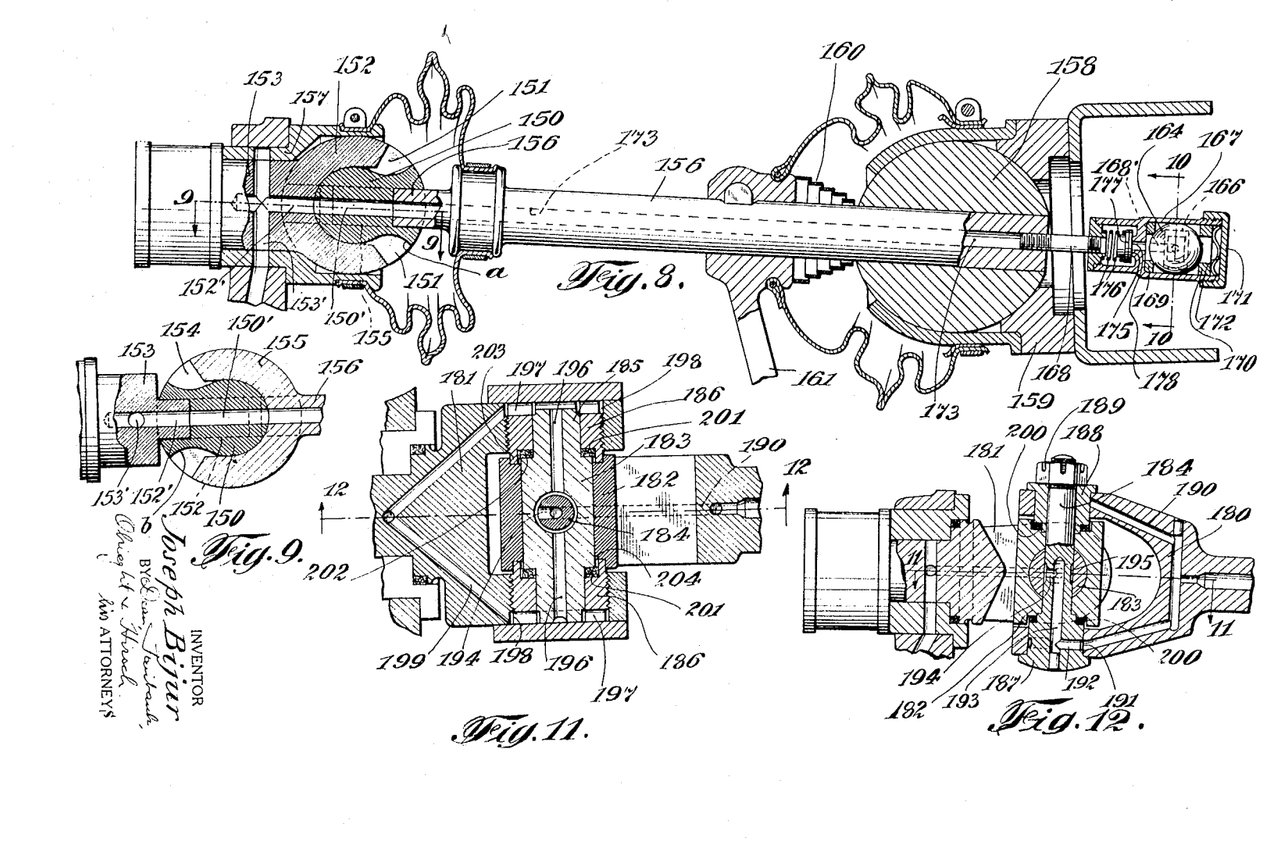
Fig. 8 is a view similar to Fig. 4 of a modified form.
Fig. 9 is a transverse sectional view taken along the line 9—9 of Fig. 8.
Fig. 11 is a sectional view taken along the line 11—11 of a modified form of universal joint, shown in Fig. 12.
Fig. 12 is a sectional view taken along the line 12—12 of Fig. 11.
Figure 10:
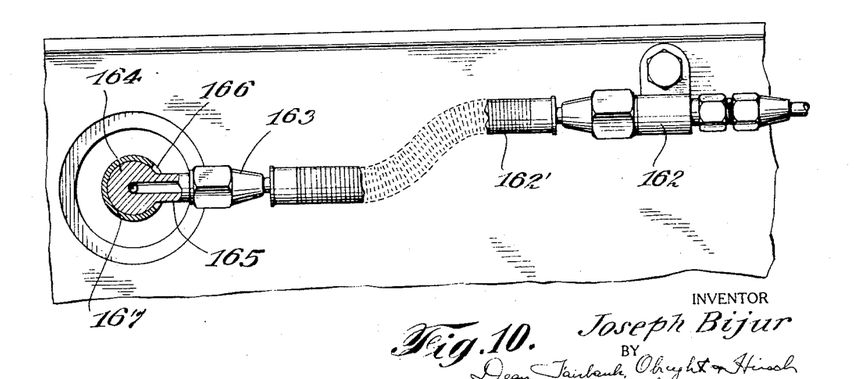
Fig. 10 is a sectional view, parts being shown broken away, taken along the line 10—10 of Fig. 8.

In Figs. 8 to 10 is shown an embodiment of brake operating cross-shaft including a universal joint at the knuckle end, which comprises a trunnion ball 150 having a groove 151 milled thereon along one great circle thereof, almost about the entire ball, said groove having ends $a$. Jaws 152 on the stub shaft 153 extend into groove 151 substantially flush with the surface of the ball. A similar groove 154 in a plane at right angles to groove 151 and having end $b$, is straddled by the jaws 155 of a yoke at the knuckle end of a unitary brake cross shaft 156, said jaws also substantially flush with the surface of the ball. The stub shaft 153 bears in a bushing 157 at the brake shield in a manner similar to that shown in Figs. 5 and 6.

Figure 5:
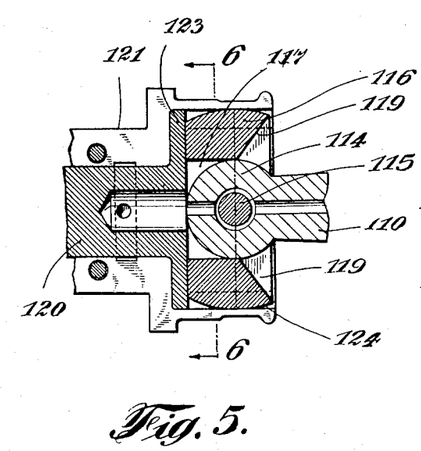
Fig. 5 is a transverse sectional view taken along the line 5—5 of Fig. 4.
Figure 6:
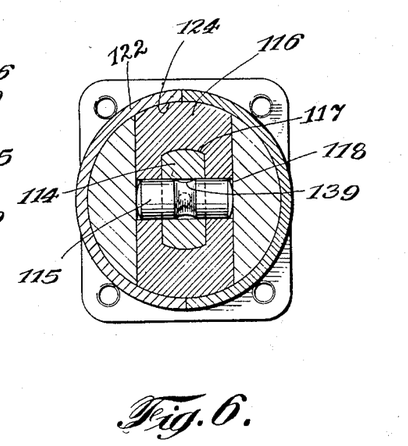
Fig. 6 is a transverse sectional view taken along the line 6—6 of Fig. 5.
Figure 7:
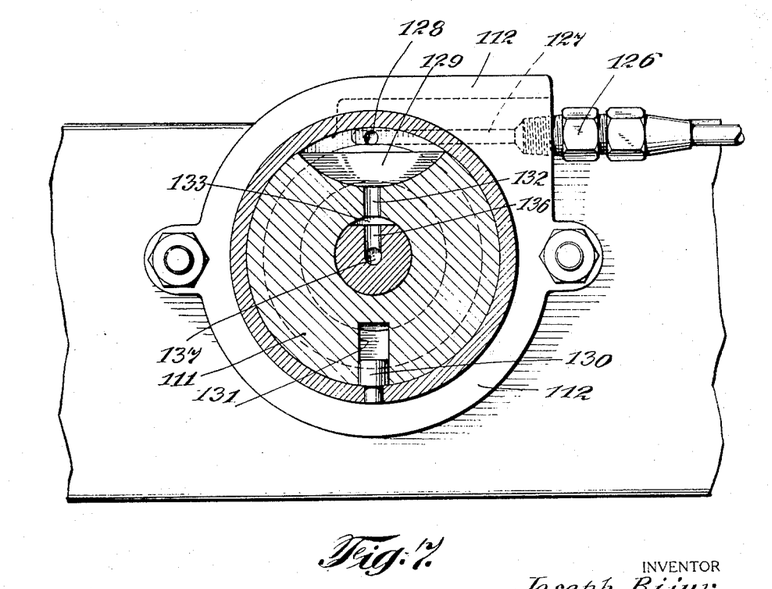
Fig. 7 is a transverse sectional view taken along the line 7—7 of Fig. 4.

The frame end of the cross shaft has a slide bearing in the ball 158 which bears in the socket 159 mounted on the channel frame as in Figs. 5 and 6. The ball joint 158 as well as the torque transmitting universal joint are enclosed in boots.

Inasmuch as the type of universal joint described will not inherently remain assembled, when force is applied tending to draw the knuckle away from the frame, a powerful coil spring 160 is interposed between the ball 158 and the keyed operating arm 161, said spring thereby tending to push the shaft 156 toward the knuckle, and exerting a compressive stress to maintain the universal joint assembled.

To lubricate the construction just described, I have illustratively shown an inlet 162, preferably a drip plug, fixed to the channel frame at a part thereof preferably well to the rear of the cross shaft 156 and delivering to a flexible conduit 162' which extends longitudinally of the channel frame with its delivery terminal 163 at a fitting mounted at the extreme channel frame end of the cross shaft 156, said fitting delivering through bore 173, the length of shaft 156 and through bore 150' aligned therewith through trunnion ball 150. Bore 150' is aligned with axial bore 152' in the driven clevis 152, which delivers to radial bore 153' in the stub shaft 153.

The inlet to the cross shaft comprises a universal joint, which permits the rocking movement of the brake shaft in applying or releasing the braking impulse, as well as any rocking incurred in the up and down movement of the knuckle, all without strain on the flexible conduit 162', the latter accommodating primarily the longitudinal slide of the cross shaft in the relative up and down movement of the steering wheels. The universal inlet fitting may comprise an inner ball member 164 having a shank 165 connected to the flexible conduit 162'. The shank 165 extends through an elongated slot 166 in an enclosing cylindrical socket 167 having a reduced tubular stem 168 threaded into the extreme frame end of the cross-shaft bore 173, and supplied from the radial bore 168' in ball 164. Preferably the ball 164 is maintained assembled within socket 167 between bearing rings 169 and 170 by means of a screw cap 171 exerting pressure through spring 172 interposed between said cap and bearing ring 170.

In operation, lubricant from the fitting 162 passes through the flexible conduit 162' into the ball 164, thence through stem 168 into and through the length of the longitudinal duct 173 of the cross shaft into the booted universal joint at the knuckle, thence through duct 150' in ball 150 through bores 152' and 153' in the stub shaft 153 to the bearings carried on the knuckle by division in the same manner as in other embodiments. The spring 160 maintains the trunnion ball loaded, pressing yoke 155 against ball 150 and ball 150 against yoke 152, thereby preventing excessive loss of lubricant in the course into and out of the trunnion ball, yet permitting sufficient spread laterally at the points of entry to and exit from the ball, to lubricate the bearings of the clevises on the ball. The bores 173, 150' and 152' are preferably of such diameter that throughout operation of the universal joint, said bores remain in direct communication with each other, to assure transmission of lubricant through the universal joint to the knuckle.

In the present embodiment, I have shown the cross shaft as sloping upward from the frame to the knuckle, an arrangement involved with certain constructions of vehicles. In the absence of special precautions the lubricant would thus not naturally tend to flow by gravity from the frame to the knuckle. I have, accordingly, provided a check valve which may be disposed within the fitting 167 and which opens under the pressure transmitted through conduit 162, in order to pass lubricant into the conduit duct 173, but prevents return, so that the duct 173 would normally be filled with lubricant and any lubricant admitted past the check valve would effect delivery of a corresponding charge from the knuckle end of the duct 173 into the universal joint and onward. The check valve may be of any appropriate construction, but preferably includes a rounded seat 175 against which is pressed by a coil spring 176 a disk valve 177 having a seat 178 of yielding material, such as vellumoid covered preferably with oiled silk.

In Figs. 11 and 12 is shown another alternative embodiment of universal joint. In this embodiment, the axes of the two cross pins intersect. Between the driving clevis 180 and the driven clevis 181 there is interposed a trunnion block 182 having a pin 183 of larger diameter with its ends bearing preferably in the jaws of the driven clevis 181. Across said pin and through a corresponding transverse aperture therein, extends a pin 184 of smaller diameter having bearings in the jaws of the driving clevis. In the embodiment shown, the driven pin 183 has its reduced bearing ends 185 extending into corresponding axial sockets of bearing screw plugs 186 threaded into corresponding openings in the driven clevis. The smaller or driving pin 184 is generally similar in construction to those in Fig. 1 and comprises an enlarged head 187 fitting in the corresponding jaw of the driving clevis 180 and a bushing 188 encircling said pin and fitting into the opposite clevis jaw, a nut 189 maintaining the pin in assembled position. The driving clevis has a lubricant duct 190 generally similar to that of Fig. 1, communicating with a peripheral groove 191 about the driving pin, which, in turn, communicates through radial bore 192, axial bore 193 and radial bore 194 to a peripheral groove 195 about the middle of the pin, said groove, in turn, delivering through a longitudinal bore 196 extending the full length of the larger or driven pin 183 and outward through transverse bore 197 in the bearing screw plugs 185 which deliver to a peripheral groove 198 about the screw plug 186, communicating with an oblique bore 199 in the stub shaft, from which the bearings carried by the knuckle are lubricated as in the other embodiments.

In order to maintain the construction dust-tight, gaskets 200 are provided for the driving pin generally similar to those shown in Fig. 1, and gaskets 201 for the driven pin compressed against shoulder 202 of said pin by the inner ends of the screw plugs 186, each of which has a pilot flange 203 encircling the corresponding gasket and fitting in a corresponding countersink 204 in the trunnion block 182.

Figure 13:
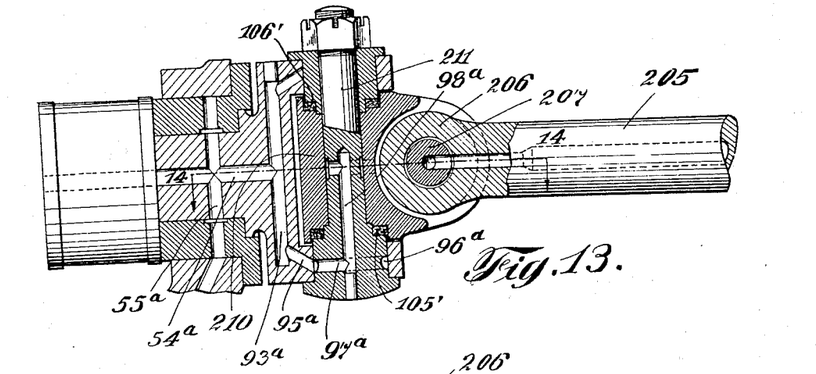
Fig. 13 is a transverse sectional view of a modified form of universal joint and associated elements, taken along the line 13—13 of Fig. 14.
Figure 14:
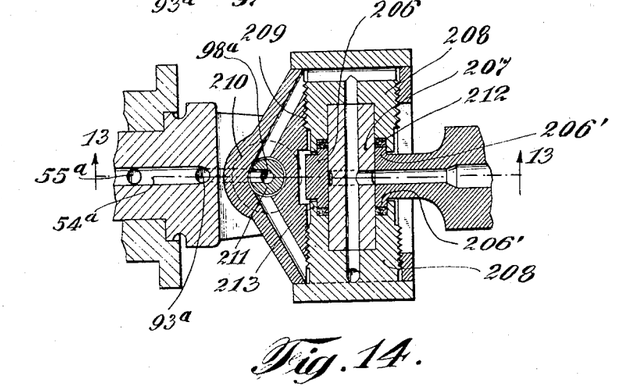
Fig. 14 is a sectional view taken along the line 14—14 of Fig. 13.

In Figs. 13 and 14 is shown another modified form of universal joint. The brake cross shaft 205 here has an eye 206 through which extends a short tubular driving pin 207 secured in position against sliding displacement by a pair of screw plugs 208 threaded into the opposite jaws of a clevis 209 formed as an integral part of a trunnion block 210. At right angles to pin 207 the trunnion block mounts a driven pin 211 having a series of bores and grooves which communicate with a series of bores and grooves in the brake stub shaft, these, in turn, delivering to the bearings carried on the knuckle, said bearings rendered dust-tight all by a construction identical with that shown in Fig. 1. Similar parts are designated by the same reference numerals as in Fig. 1 with exponent $a$. In this embodiment also, dust-excluding gaskets 212 encircle the tubular pin 207 and are pressed in position against the opposite surfaces of the eye 206 by the inner ends of the screw plugs 208, which are also provided with integral piloting flanges 213 enclosing the outer periphery of the gaskets and corresponding bosses 206' of the eye 206.

Figures 15, 16:
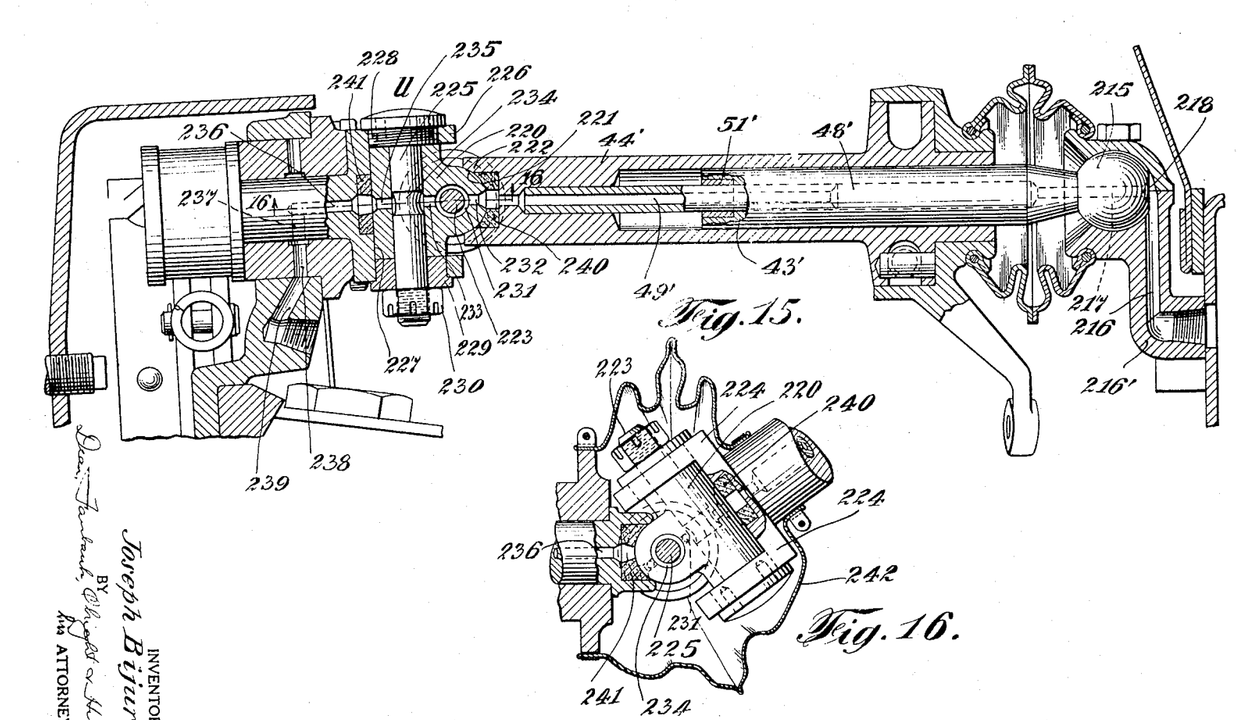
Fig. 15 is a view in longitudinal section similar to Figs. 4 and 8 of a modified embodiment, the boot for the knuckle universal joint being omitted to avoid complicating the figure.
Fig. 16 is a transverse sectional view taken along the line 16—16 of Fig. 15.

In Figs. 15 and 16, I have shown another modification. The rod 43', sleeve 44', pipe 49' and bushing 51' are duplicates of the elements bearing corresponding numerals in Fig. 1. The ball 215 is, however, shown unloaded, the spring 52 of Fig. 1 being omitted and the lubricant from duct 216 in fitting 216' entering diametrical bore 217 of the ball at a flattened area 218 on said ball.

The lubricant is passed to the knuckle by flowing substantially along the horizontal axial plane of the universal joint U. For this purpose the trunnion block 220 has a cylindrical conformation 221 bearing in a corresponding cylindrical hollow 222 at the knuckle end of the sleeve 44', the bolt 223 through the trunnion block being mounted in the eyes 224 of the clevis at the sleeve end. The trunnion block is, moreover, supported by a bolt 225 at right angles to bolt 223, in turn, mounted in the eyes of the clevis 226 on the stub shaft. The clevis jaws have openings of the outer diameter of the corresponding part of the trunnion block, and the intervening part of the stub shaft end is machined to provide a cylindrical hollow 227 of the same diameter, in which the trunnion block bears. The trunnion block is confined at the upper end shown in Fig. 15 by bolt head 228 which is of diameter substantially equal to that of the trunnion block cylinder end of the clevis eye. At the lower end, the trunnion block is supported by a collar 229 in the other clevis eye, the parts being drawn together by the bolt nut 230.

The lubricant duct through the universal joint, as shown, extends from the bore 49' to a peripheral groove 231 about the middle of bolt 223 by way of port 232 in the trunnion block 220, thence through port 233 in the trunnion block, about groove 234 in the middle of bolt 225 and thence through port 235 in the trunnion block 220 and into the axial bore 236 in the stub shaft, which, in turn, communicates with a radial bore 237 therethrough and through the bearing bushing bore 238 delivering into the duct 239 in the brake shield, whence the lubricant passes on to the knuckle bearings in the manner heretofore described in connection with Fig. 1 or Fig. 4. The ports 232, 233 and 235 in the trunnion block being all aligned axially of the universal joint, it will be seen that the main course of lubricant therethrough is substantially in the axial horizontal plane thereof, the lubricant passing about the bolts 223 and 225 at the grooves in the middle thereof, some of the lubricant spreading by capillary action to lubricate the bearing surfaces of the corresponding bolts. A fair degree of oil-tightness of the bearing surface between the sleeve end 222 and the trunnion block 220 is assured by a leather packing 240 fitted in a corresponding socket in the sleeve end, and a similar packing 241 is similarly mounted in the stub shaft hollow 227 to minimize leak at the bearing surface of the latter with respect to the trunnion block. However, it is preferred to enclose the universal joints in a boot 242 shown only in Fig. 16, to preclude loss of lubricant or entry of dust.

In all of the embodiments, the oil conduit being built into or constituting a part of the brake cross-shaft assembly, accommodates the various relative movements between the frame and the knuckle, and is rugged, self-sustaining between its ends and neither sags, flaps nor whips. The cross-shaft construction substantially, as shown, could be used within the scope of my invention, if desired, for instance, in vehicles devoid of steering wheel brakes, for the sole purpose of conveying oil from the frame to the knuckle.

It will also be understood that in its broader aspects, the invention is applicable also to the lubrication of or the conveyance of lubricant through a brake cross shaft bridging to the knuckle from the axle or from a part rigid with the axle rather than from the frame.

It will be understood, of course, that the various constructions of torque transmitting universal joints herein disclosed may be interchangeably used in any of the assemblies shown, except, as heretofore noted, that the embodiment of Figs. 8 and 9 requires some means, such as spring 160, to maintain it assembled for use.

I claim:—

1. In a motor vehicle, in combination, an axle, a knuckle with a pivot mount thereon, means for supplying bearings associated with said knuckle with lubricant from a part of said vehicle other than said knuckle, said means comprising an external oil conduit bridging from said other part to said knuckle, and an interior draining conduit delivering the lubricant from said conduit to bearings of said knuckle, said internal conduit including a spiral-like groove around said pivot mount.

2. In a motor vehicle, of the type including an axle, a steering wheel knuckle, a king pin connecting said elements in pivoting relation, a brake shield rigid with said knuckle, and adjacent said king pin, a brake operating shaft bridging to said knuckle and having a bearing in said shield, said brake operating shaft having a joint substantially aligned with the king pin to accommodate the relative movement of the parts; the combination therewith of a duct through said brake operating shaft having a lubricant inlet near the end thereof remote from said brake, said joint affording a conduit for lubricant, and a duct from said shaft through a part of said brake shield for delivering lubricant to a bearing surface of said knuckle.

3. In a motor vehicle, of the type including, a frame, an axle, a steering knuckle, a king pin connecting said latter members in pivoting relationship, a brake shield rigid with said knuckle, and a brake shaft bridging transversely from said frame to said shield and having a bearing in the latter, and including a universal joint substantially aligned with said king pin; the combination therewith of means supplying lubricant to the frame end of said brake shaft, said brake shaft being hollow for conveying lubricant and a lubricant duct draining said shaft and extending through said brake shield to the region of said king pin and dividing means for conveying part of the lubricant to the king pin and part to one or more other bearings associated with the knuckle.

4. In a motor vehicle, in combination, an axle, a steering knuckle, a king pin effecting the pivot mount between said elements, a tie rod bearing rigid with said knuckle, lubricant supply means, said means comprising a lubricant inlet adjacent the upper bearing of said king pin, a groove about said bearing collecting the lubricant from said inlet, a duct connecting said groove with the king pin bearing, and a pipe connected to said groove and extending in parallel with said duct downward along structure of the vehicle to the tie rod bearing.

5. In a motor vehicle, in combination, an axle, a steering knuckle, a king pin connecting said elements in pivoting relation, a tie rod arm and a steering arm both rigid with said knuckle, said king pin having a bearing bushing at the upper end thereof, a groove thereabout, a lubricant inlet communicating with said groove, one or more radial ducts through said bushing leading to the bearing surface of the king pin and pipes communicating with said groove and extending along structural parts of the knuckle respectively to the tie rod and steering arm bearings.

6. In a front wheel construction of the type including a front wheel knuckle having a brake shield, a brake operated from a shaft extending transversely from the chassis through said shield and having bearings at both ends in which it is rocked in operation, and constructed and arranged to accommodate the displacement of the knuckle relative to the frame in vertical and horizontal planes and in the steering action; the combination therewith of a lubricant inlet member at the chassis frame end of said conduit from which the lubricant passes by gravity flow to the successive bearings along the length of the shaft.

7. In a front wheel construction of the type including a front wheel knuckle having a brake shield, a brake operated from a shaft extending transversely from the chassis through said shield and having bearings at both ends in which it is rocked in operation, and constructed and arranged to accommodate the displacement of the knuckle relative to the frame in vertical and horizontal planes and in the steering action; said shaft comprising a rod having a ball end for support in a corresponding socket at the chassis frame, a sleeve telescoped over said rod, a universal joint at the knuckle end of the sleeve, a brake operating stub shaft connected to said universal joint, a lubricant duct through the ball and longitudinally through the rod, an axial outlet pipe connected to one of said rod and sleeve and extending toward said universal joint, and a bushing encircling said pipe to prevent ready return toward the chassis frame of lubricant delivered from said pipe.

8. In a front wheel construction of the type including a steering wheel having a brake, a brake shield thereon, a brake operating cam having a stub shaft bearing in said shield, a sleeve having a universal joint connection to said stub shaft, a rod telescoped in said sleeve and having a universal joint connection at the chassis frame; the combination therewith of means feeding lubricant from said chasis frame to and through an axial bore in said rod, an axial pipe fixed in the end of one of said rod and sleeve and extending towards said universal joint, and a bushing about said pipe and fixed in said sleeve to prevent the return to the chassis frame of the lubricant delivered through said pipe.

9. In a motor vehicle, a frame and a steering knuckle, a combined front wheel brake operating member and conduit for conveying lubricant from the frame to bearings associated with the knuckle, said member including a rock shaft having a bearing at the frame and a bearing at the knuckle, and a universal joint substantially aligned with the pivot axis of the knuckle, a duct through said shaft leading from an inlet at said frame, said universal joint being constructed and arranged for transmission of lubricant through the structure thereof to the knuckle and having means to exclude dirt and water from the course of lubricant flow.

10. In a front wheel knuckle construction, of the type comprising control appurtenances including a tie rod arm and a brake, means for operating the brake including a shaft bridging from the chassis frame, said shaft comprising a cam stub having a bearing in the brake shield, a sleeve having a universal joint connection to said stub, a rod telescoped in said sleeve and having a ball and socket connection to the chassis frame, the combination therewith of means for supplying lubricant in series to the various bearing surfaces along said bridging shaft and at said knuckle construction, said means comprising an inlet on the ball and socket joint, a duct axially through said rod, an axial pipe fixed in one of said shaft elements, a bushing about said pipe to minimize seepage of lubricant around said pipe, a duct through the elements of said universal joint delivering lubricant in succession to the various bearing surfaces of said universal joint, a duct delivering excess lubricant from said universal joint through said stub shaft into a duct in said brake shield, and a pipe draining lubricant from said duct to the tie rod bearing, said pipe extending along the structure of the brake shield and the tie rod arm.

11. A motor vehicle structure including an axle, a knuckle, a king pin providing a steering mount for said knuckle, means for conveying lubricant to said knuckle, said means comprising a rigid conduit bridging from a part of said structure to said knuckle and including a universal joint coaxial with said king pin, the knuckle outlet of said bridging line being lower than the inlet at said structure, said universal joint affording a continuous passage therethrough for lubricant flowing by gravity from the body to the knuckle, said passage crossing the bearing surfaces of the universal joint for applying lubricant thereto.

12. The combination set forth in claim 11 in which the passage through the universal joint has its outlet lower than its inlet, whereby the lubricant will tend to pass to the knuckle rather than to leak from the joint.

13. In a motor vehicle structure of the type including a frame, an axle, a knuckle, a king pin providing a steering mount for said knuckle, the combination therewith of means for conveying lubricant to said knuckle, said means comprising a rigid conduit bridging from said frame structure to said knuckle and including a universal joint substantially coaxial with said king pin, the outlet of said bridging line being lower than the inlet at the frame, said universal joint affording a continuous gravity flow passage therethrough from the structure to the knuckle, said passage crossing the trunnion surfaces of the universal joint for applying lubricant thereto, and compression gaskets flanking the bearings of said universal joint to prevent the loss of lubricant therefrom, whereby lubricant under pressure can be conveyed through the universal joint to the knuckle.

14. A front wheel construction of the type including a knuckle, a brake, an actuating shaft therefor which extends transversely from the chassis through a brake shield on said knuckle and has a ball and socket bearing at the chassis end, and a universal joint substantially in axial alignment with the pivot axis of the knuckle, and which includes telescoping parts between said universal joints; the combination therewith of means for conveying lubricant from the chassis frame to the various bearings of said brake shaft and to other bearings carried by the knuckle, said means including a lubricant inlet at the chassis frame, longitudinal lubricant ducts supplied therefrom and through the telescoping elements of said actuating shaft, means for leading lubricant from the knuckle end of said actuating shaft to said other bearings, a flexible boot connecting the chassis end of the actuating shaft to the contiguous ball socket, and means rendering dust-tight the universal joint at the knuckle end, whereby the lubricant will be passed to the various bearings at the knuckle through the brake actuating shaft without entry of dust thereto.

15. In brake operating mechanism for steering wheels, in combination, a transverse shaft including a universal torque transmitting joint substantially aligned with the steering pivot, said joint having a non-leaking oil conveying passage therethrough for delivering lubricant supplied at an end of said shaft through to the bearings of the steering knuckle, said joint including a driving clevis, the jaws of which normally extend substantially horizontally, a driven clevis, the jaws of which extend substantially vertically, a trunnion block therebetween having a substantially horizontal bolt bearing therein and fixed in said driving clevis, and a substantially vertical bolt bearing therein and fixed in said driven clevis, a lubricant duct extending through one of the horizontal clevis arms of the driven clevis into and longitudinally of the horizontal bolt, thence through the trunnion structure to the vertical bolt, draining downward through the latter to the lower clevis jaw of the driven member and through the latter to other bearings.

16. In a motor vehicle, of the type including a front wheel knuckle, a front wheel brake carried thereby, an actuating shaft for said brake bridging from the chassis frame to said knckle, the combination in which said shaft constitutes also a conduit for lubricant to be conveyed to the knuckle, said shaft including a rod element having a ball at the chassis end, a socket on the chassis coacting with the ball, spring means pressing said ball and said socket together, a lubricant inlet through said socket, delivering to said ball, and a longitudinal passage from said ball through said shaft for conveying the lubricant therethrough.

17. A lubricated mechanism including a chassis structure, a steering knuckle, a pivot mount therefor, means for conveying lubricant from said structure obliquely upward to a higher portion of said knuckle, said means comprising a conduit supported on the knuckle at one end and on the structure at the other and including a rigid pipe and a universal joint coaxial with said mount to accommodate the movements of the knuckle, said joint having a lubricant passage therethrough for delivering from said conduit to said knuckle, and a check valve at the lowest part of the bridging conduit to prevent return of lubricant past the lubricant inlet at the structure.

18. In a motor vehicle, in combination, a vehicle structure including an axle, a steering knuckle having a pivot mount on said axle, a brake on said steering knuckle, operating linkage for said brake bridging from said structure, including a rock shaft having a bearing at one end in said structure, a stub shaft bearing in said knuckle and a torque transmitting universal joint substantially coaxial with the pivot axis, said joint including a driving clevis integral with said rock shaft, a driven clevis on the knuckle and an interposed trunnion ball, a lubricant passage longitudinally of said rock shaft, through the stem of the driving clevis, through the trunnion ball into the stem of the driven clevis and thence onward to bearings carried by the knuckle, and means pressing the parts of said universal joint together to prevent substantial leak at the points of entry to and of exit from the trunnion ball.

19. A steering wheel brake of the type including a brake operating rock shaft bridging from the frame of the vehicle to the knuckle and having a slide bearing at the frame end, a rotary cam stub shaft at the knuckle end and a torque transmitting universal joint therebetween coaxial with the steering pivot, said joint including a trunnion ball, a driving clevis on the rock shaft and a driven clevis on the stub shaft; the combination therewith of means for conveying lubricant axially of said cross shaft and through said universal joint to supply with lubricant bearings carried by the knuckle, and a spring urging said driving clevis against said ball and said ball against said driven clevis to limit the leak of lubricant at its entry into the trunnion ball and at its exit from said trunnion ball while permitting sufficient spread to lubricate the bearings of the clevis on said trunnion ball.

20. In a motor vehicle of the type including an axle, a steering knuckle, a king pin effecting a pivot mount for the latter, said steering knuckle having a steering arm rigid therewith, a drag link extending rearward from said steering arm and a steering lever for operating said link; the combination therewith of means for lubricating the bearings of all of said elements from a single source, said means comprising an inlet near the upper bearing of the king pin, lubricant collecting means near the upper end of said king pin, a pipe supplied from said collecting means and extending along the structure of said knuckle, to supply the steering arm bearing, and lubricant conveying means through said drag link delivering part of the charge from the forward bearing thereof rearward to the bearing at the steering lever end thereof.

21. The combination set forth in claim 20 in which the knuckle carries a tie rod bearing and a pipe supplied from said collecting means extends along the structure of the knuckle to the tie rod bearing.

22. In a motor vehicle of the type including a frame, an axle, a steering knuckle, a king pin constituting a bearing mount for the latter, a brake shield on said knuckle, a bridging brake operating shaft having a bearing on said frame and a bearing in said brake shield and including a universal joint substantially aligned with said king pin for accommodating the movement of the knuckle relative to the frame, said knuckle including a tie rod arm rigid therewith having a bearing at its outer end; the combination therewith of means for lubricating the bearings of all of said elements from a common source at said frame, said means comprising a lubricant inlet at said frame, a lubricant duct through said brake operating shaft, said universal joint affording a lubricant passage, draining means from said shaft through said shield to a groove adjacent the upper end of said king pin, a duct connecting said groove to the bearing surface of the king pin and a pipe extending along the structure of the knuckle and connecting said groove to the bearing of said tie rod arm.

23. In a lubricated mechanism, in combination, a frame, a relatively movable bearing structure, an operating rock shaft bridging from the frame to the structure, said rock shaft having a slide mount in a ball surrounding the frame end thereof mounted in a corresponding socket, a universal joint at the structure end, and a longitudinal bore therethrough for conveying lubricant, said universal joint structure affording a lubricant passage therethrough, means for draining said shaft to supply lubricant to the structure, and inlet means for supplying lubricant from the frame to said rock shaft, said means comprising a tube on the frame delivering into the sliding end of said rock shaft and flexing to accommodate the sliding and rocking movements of said shaft.

24. The combination set forth in claim 23 in which the flexible inlet comprises a tube of type that does not transmit torsional strain, said tube extending in a general direction at right angles to said rock shaft, a swivel fitting fixed on the end of said rock shaft and having a lateral inlet for said tube, whereby the rocking movements of the shaft will be accommodated by said swivel and the sliding movement by flexure of said flexible conduit.

25. In a motor vehicle, in combination, an axle, a steering knuckle, a king pin affording a pivot mount for said knuckle, a lubricant inlet at an elevated part of said knuckle and delivering through a port in the structure thereof to the upper bearing surface of said king pin, and a curved groove on the exterior of the king pin to convey lubricant downwardly from said upper bearing surface.

26. In a motor vehicle, of the type comprising an axle, a steering knuckle, a king pin providing a pivot mount therefor, a brake on said knuckle, an operating rock shaft therefor bridging to an upper part of said brake above said king pin from another part of the vehicle, said rock shaft including a universal joint substantially aligned with the king pin to accommodate various movements of the knuckle, the combination in which said cross shaft has a lubricant duct therethrough lengthwise thereof and through said universal joint into the upper bearing of the king pin, and said king pin is constructed and arranged to permit lubricant to spread from the upper to the lower bearing surface thereof, and in which dust-excluding means are provided at the various bearing surfaces of the universal joint and of the king pin.

27. The combination set forth in claim 26 in which the lubricant duct extends from the brake end of the rock shaft through the structure of the brake shield to the upper bearing of the king pin.

28. In a motor vehicle, in combination, a steering wheel, a brake therefor, means for operating the brake including a rock shaft bridging from another part of the vehicle to the knuckle, supported at one end by said knuckle and at the other by said vehicle part and including a torque transmitting universal joint substantially aligned with the steering pivot axis, and means for lubricating the bearings of said rock shaft including an inlet adjacent the vehicle part, said rock shaft having a bore longitudinally therethrough delivering to said universal joint.

29. In a motor vehicle, in combination, a steering knuckle, a brake therefor, an operating rock shaft bridging to said knuckle and having a bearing at one part of the vehicle structure, and a universal torque transmitting joint coaxial with the pivot axis of said knuckle, a lubricant inlet near said bearing and mounted to remain fixed independently of the rocking movements of said shaft and a bore longitudinally of said rock shaft feeding to said universal joint lubricant supplied thereto from said inlet.

30. A motor vehicle structure including an axle, a knuckle having a pivot on said axle, a brake on said knuckle, rock shaft linkage bridging from said structure for operating said brake, said linkage having a bearing at said structure and another bearing at said knuckle and a torque transmitting universal joint coaxial with said pivot, said universal joint including a trunnion ball, a driving clevis integral with the portion of the rock shaft intervening between the structure and the universal joint, means maintaining said clevis against said trunnion ball, a bore longitudinally of said cross shaft for feeding lubricant to said universal joint, and a lubricant inlet with respect to which said rock shaft has a swivel mount, said inlet supplying said bore with lubricant.

31. In a motor vehicle, in combination, a vehicle structure including an axle, a steering knuckle, a king pin constituting a steering bearing therefor, a brake on said steering wheel, an operating rock shaft for said brake, having a bearing at said knuckle at one end and a bearing at said structure at the other end and bridging therebetween, said operating shaft having a torque transmitting universal joint substantially coaxial with the king pin, said joint including a driving clevis, a driven clevis and a trunnion ball therebetween, means limiting longitudinal displacement of said shaft, thereby preventing separation of the parts of said universal joint, means supplying said universal joint with lubricant from said rock shaft, said means comprising an inlet pipe fixed on the structure and disposed to maintain a fixed position relative to the bearing of said rock shaft at the structure and a longitudinal bore through said rock shaft supplied from said inlet and delivering at the stem of the driving clevis of the universal joint to supply the bearings of said universal joint.

32. The combination set forth in claim 31 in which the bore in the rock shaft is in communication with the bearing of said rock shaft in the vehicle structure.

33. In a vehicle construction of the type including a front wheel knuckle, a brake thereon, an operating shaft therefor extending transversely from the chassis and having bearings at both ends in which it is rocked in actuation, and constructed and arranged to telescopically accommodate the displacement of the knuckle relative to the frame in vertical and horizontal planes and in steering action; the combination therewith of a lubricant inlet to said operating shaft at the frame end thereof and a lubricant duct extending through the length of said shaft and communicating with the bearings thereof.

34. In a front wheel construction of the type including a front wheel knuckle having a brake shield, a brake operated from a shaft extending transversely from the chassis through said shield and having bearings at both ends in which it is rocked in operation, and constructed and arranged to accommodate the displacement of the knuckle relative to the frame in vertical and horizontal planes and in the steering action; the combination therewith of a lubricant inlet member at the chassis frame end of said conduit from which the lubricant passes by gravity flow to the successive bearings along the length of the shaft.

35. As an article of manufacture, a front wheel brake actuating shaft comprising a rod having a ball end adapted for universal mount in a corresponding socket on the chassis frame, a second shaft element including a socket into which said rod is telescoped and having a universal joint between its ends, said shaft including a portion adapted to be journaled in a brake shield, an oil duct through said shaft for conveying lubricant from the chassis frame to said universal joint and said bearing, said duct including a longitudinal passage through said rod and through said second shaft element, said duct having an inlet from the chassis frame at said ball.

36. In a motor vehicle, in combination, a front wheel knuckle, a front wheel brake carried thereby, an actuating shaft for said brake bridging from the chassis frame to said knuckle, said shaft constituting also a conduit for lubricant to be conveyed to the knuckle, said shaft including a rod element having a ball at the chassis end, a socket on the chassis coacting with the ball, spring means pressing said ball and said socket together, a lubricant inlet through said socket, delivering to said ball, and a longitudinal passage from said ball through said shaft for conveying the lubricant therethrough.

37. Means for lubricating the mechanism employed in vehicle front wheel brake controls, comprising a brake control shaft having one end universally supported on the chassis, said control shaft having a passage therethrough, and a fixed lubricant supplying member adapted to be coupled to the chassis end thereof at the center of the universal movement of the shaft and in communication with said passage.

38. Means for lubricating the mechanism employed in vehicle front wheel brake controls, comprising a hollow brake control shaft having one end universally supported on a non-rotating part of the vehicle, and means for passing lubricant to and through said hollow control shaft for the purposes described, including a pair of lubricant conduits universally jointed for movement about the center of the universal movement of the shaft.

39. In vehicle front wheel brake control mechanisms, means for lubricating the same, comprising a control shaft having an oil passage substantially throughout its length extending from adjacent the wheel to a universal chassis support, and a fixed lubricant-supplying member adapted to be connected with said passage within said universal support and substantially at its center of universal movement for the purposes described.

40. A brake-operating mechanism comprising, in combination, a chassis frame, a brake-applying shaft having its inner end adjacent said frame, a support for the inner end of the shaft carried by said frame and including a joint permitting universal and axial movement of the shaft, a lubricant fitting fixedly mounted on the frame, and means for conveying lubricant from the fitting to said joint substantially unaffected by movement of the shaft.

41. Brake-operating mechanism comprising, in combination, a chassis frame, a brake applying shaft having its inner end adjacent said frame, a fixed support carried by said frame, a movable support carrying the inner end of the shaft and mounted on the fixed support and permitting universal and axial movement of the shaft, a lubricant fitting fixedly mounted on the frame, and means for conveying lubricant from the fitting to the shaft.

42. An automobile lubrication installation for the bearings of the brake actuating and steering mechanism associated with a pivotally mounted knuckle, said installation receiving its supply from the chassis frame and comprising a conduit extending from said chassis frame to said knuckle arranged in part to accommodate relative movement therebetween and a conduit system associated with said knuckle structure leading to said bearings with an inlet receiving lubricant from said first mentioned conduit.

43. An automobile lubricating installation for the bearings associated with a pivotally mounted knuckle, said pivotal mount including a substantially vertical pin, a brake actuating connection to said knuckle, the knuckle end of which is positioned adjacent said pin, and said installation comprising a conduit system leading to said bearings formed in part by passageways along said vertical pin and said brake actuating connection.

44. In a front wheel construction of the type including a front wheel knuckle having a brake shield, a brake operated from a shaft extending transversely from the chassis through said shield and having bearings at both ends in which it is rocked in operation, and constructed and arranged to accommodate the displacement of the knuckle relative to the frame in vertical and horizontal planes and in the steering action; the combination therewith of a lubricant inlet member at the chassis frame end of said conduit from which the lubricant passes by gravity flow to the successive bearings along the length of the shaft, the lubricant delivered lengthwise through the shaft being conveyed therebeyond to oil various bearings carried by the knuckle.

45. In a motor vehicle, in combination, an axle, a knuckle with a pivot mount thereon, means for supplying bearings associated with said knuckle with lubricant from a part of said vehicle other than said knuckle, said means comprising an external oil conduit bridging from said other part to said knuckle, and an interior draining conduit delivering the lubricant from said conduit, to bearings of said knuckle, said interior conduit including a groove in the exterior face of the pivot mount extending longitudinally from the upper end of the mount to the lower end of the mount.

46. In a motor vehicle, in combination, an axle, a knuckle with a pivot mount thereon, means for supplying bearings associated with said knuckle with lubricant from a part of said vehicle other than said knuckle, said means comprising an external oil conduit bridging from said other part to said knuckle, and an interior draining conduit delivering the lubricant from said conduit to bearings of said knuckle, said pivot mount being provided with an annular trough around the upper end thereof feeding said interior conduit and receiving lubricant from said exterior conduit.

47. A lubrication installation for a vehicle with a chassis frame, a knuckle having associated bearings and carrying a brake arrangement and a brake actuating connection extending from the chassis frame to the knuckle, said installation including a lubricant inlet at the frame, a conduit extending along the brake connection from the frame with an outlet at the knuckle and passageways from said conduit outlet to said bearings.

48. In a motor vehicle of the type having a chassis frame, a knuckle with associated bearings including bearings of a pivotal mount and carrying a brake arrangement, and brake actuating connections extending from the chassis frame to the knuckle, said connections having a plurality of bearings some of which are carried on the knuckle; a lubricating installation comprising a lubricant source on the chassis frame and a distributing conduit system leading from said source to the bearings of the connections and the pivotal mount.

49. In a motor vehicle of the type having a chassis frame, a knuckle with associated bearings including bearings of a pivotal mount and carrying a brake arrangement, and brake actuating connections extending from the chassis frame to the knuckle; a lubricating installation comprising a lubricant source on the chassis frame and a distributing conduit system leading from said source to the bearings, said conduit system including passageways along said connections and longitudinally along said pivotal mount from the upper to the lower end thereof.

50. In a motor vehicle of the type having a chassis frame, a knuckle with associated bearings including bearings of a pivotal mount and carrying a brake arrangement, and brake actuating connections extending from the chassis frame to the knuckle; a lubricating installation comprising a lubricant source on the chassis frame and a distributing conduit system leading from said source to the bearings, said conduit system including a passageway from the chassis frame to the knuckle enclosed in said connections and another passageway along said pivotal mount receiving lubricant from said first mentioned passageway.

51. In a motor vehicle of the type having a chassis frame, a knuckle with associated bearings including bearings of a pivotal mount and carrying a brake arrangement, and brake actuating connections extending from the chassis frame to the knuckle, said connections having bearings carried by the knuckle; a lubricating installation comprising a lubricant source on the chassis frame and a distributing conduit system leading from said source to the bearings, said conduit system leading the lubricant in series from the bearings of said connections to the bearings of the pivotal mount.

52. In a motor vehicle of the type including a knuckle having a pivotal mount and carrying tie rod and drag link bearing elements; the combination therewith of a lubricating installation including a distributing receiver at the upper portion of said pivotal mount and conduits leading from said receiver to said tie rod and drag link bearing elements, the initial portions of said conduits sloping downwardly from said receiver at approximately the same angle to the horizontal.

53. In a motor vehicle of the type including a knuckle having a pivotal mount and carrying tie rod and drag link bearing elements; the combination therewith of a lubricating installation including a distributing receiver at the upper end of said pivotal mount and conduits leading from said receiver to said tie rod and drag link bearing elements, initial portions of said conduits being at approximately equal angles to and on opposite sides of the center line of the axle.

54. In a motor vehicle, in combination, an axle, a steering knuckle, a king pin provided with a longitudinal passageway and affording a pivot mount for said knuckle with upper and lower bearings, a lubricant inlet supplying an elevated part of said knuckle and delivering through an opening in the structure thereof to the upper bearing surface of said king pin, an annular collecting well at the upper end of the knuckle, said lower king pin bearing being supplied from said well by said passageway.

55. In combination, a supporting frame, an actuating member, an operating shaft from said frame to said member comprising a tubular member having a ball and socket joint connection at the frame including a fixed socket element and a ball element fitting and moving therein, means for leading lubricant from an inlet in the fixed socket by gravity into a corresponding well in the ball for delivery seriatim to various bearings on the operating member, and a key connection between said socket element and said ball element to permit relative movement and also to maintain the well of the ball in registry with the lubricant inlet at all times.

56. In a lubricated mechanism, in combination, a supporting frame, a relatively moving structure, an operating shaft bridged to the structure from the frame, said shaft having a sliding joint connection with respect to the frame, said sliding joint connection including a pair of bearing elements one of which is connected to the frame and the other of which is connected to the operating shaft and a trunnion joint at said structure for said operating shaft, said lubricated mechanism including means for conveying lubricant to the structure from the frame, said lubricant conveying means comprising a longitudinal bore through said operating shaft past said trunnion joint leading to the structure, means preventing leak of lubricant from the structure at said trunnion joint, and means admitting lubricant to the frame end of said shaft, said admitting means comprising a lubricant inlet fixed relatively to the frame and a conduit through the element of said sliding joint connected to the frame, said element receiving lubricant from said inlet.

57. In a mechanism of the type including a supporting frame, a relatively moving structure, an operating shaft bridging from the supporting frame to the relatively moving structure, said operating shaft being provided with a ball mount at the supporting frame end in which the frame end of the operating shaft is slidably mounted, and being also provided with a universal joint at the relatively moving structure end; the combination therewith of a lubricating installation for conveying lubricant from the supporting frame to the relatively moving structure, said installation comprising a fixed inlet on the supporting frame, a trough in said ball mount intercepting lubricant from said fixed inlet, a longitudinal duct in said operating shaft intercepting lubricant from said trough, passage means receiving lubricant from said longitudinal duct passing through said universal joint and an outlet on said relatively moving structure receiving lubricant from said passage means.

58. In a mechanism of the type including a supporting frame, a relatively moving structure, an operating shaft for bridging from the supporting frame to the relatively moving structure, said operating shaft being provided with a ball mount at the supporting frame end in which the frame end of the operating shaft is slidably mounted, and being also provided with a universal joint at the relatively moving structure end; the combination therewith of a lubricating installation for conveying lubricant from the supporting frame to the relatively moving structure, said installation comprising a fixed inlet on the supporting frame, a trough in the ball mount intercepting lubricant from said inlet, a flat on said operating shaft receiving lubricant from said trough, a longitudinal duct through said operating shaft also receiving lubricant from said trough, passage means through said universal joint communicating with said longitudinal duct and an outlet on said relatively moving structure receiving lubricant from said passage means.

59. In a mechanism of the type including a frame, a relatively moving bearing structure, and an elongated operating member extending from said frame to said structure, said operating member being provided with joint connections to said frame and to said structure, each including a plurality of relatively rotatable bearing elements having contacting bearing surfaces; the combination therewith of a lubricating installation for conveying lubricant from the frame to the relatively moving structure, said installation comprising a lubricant inlet located on the frame and supplying lubricant to the joint connection at said frame, a longitudinal duct through said operating member between said joints, an outlet carried by said relatively moving structure and systems of bores passing axially through each of the bearing elements of said joint connections and substantially centrally and transversely across the contacting bearing surfaces, whereby said bearing surfaces are lubricated, one system passing through the joint connection at the frame end to establish communication between the inlet and the longitudinal duct, and the other system passing through the joint connection at the relatively moving structure end to establish communication between the longitudinal duct and the outlet.

JOSEPH BIJUR.